(12) United States Patent  (10) Patent No.: US 6,753,925 B2
Limaye  (45) Date of Patent: Jun. 22, 2004

(54) AUDIO/VIDEO PROCESSING ENGINE

(75) Inventor: Ajit M. Limaye, Hillboro, OR (US)

(73) Assignee: Tektronix, Inc., Beaverton, OR (US)

( * ) Notice: Subject to any disclaimer, the term of this patent is extended or adjusted under 35 U.S.C. 154(b) by 392 days.

(21) Appl. No.: 09/823,402

(22) Filed: Mar. 30, 2001

(65) Prior Publication Data

US 2002/0140857 A1 Oct. 3, 2002

(51) Int. Cl.[7] ............................................. H04N 9/475
(52) U.S. Cl. .......................... 348/515; 348/719; 710/8; 712/36
(58) Field of Search ................................ 348/515, 714, 348/719; 710/72, 74, 8, 12, 14; 712/32, 36, 229; 326/37, 39, 40, 63

(56) References Cited

U.S. PATENT DOCUMENTS

| 5,361,373 | A | * | 11/1994 | Gibson ......................... 395/800 |
| 5,504,454 | A | * | 4/1996 | Daggett et al. ............. 324/304 |
| 6,072,994 | A | * | 6/2000 | Phillips et al. ................ 455/84 |
| 6,175,789 | B1 | * | 1/2001 | Beckert et al. ............... 701/33 |
| 6,370,603 | B1 | * | 4/2002 | Silverman et al. ............ 710/72 |
| 6,483,344 | B2 | * | 11/2002 | Gupta ......................... 326/41 |
| 2002/0028680 | A1 | * | 3/2002 | Jenkins et al. .............. 455/454 |

* cited by examiner

Primary Examiner—Victor R. Kostak
(74) Attorney, Agent, or Firm—Francis I. Gray

(57) ABSTRACT

An audio/video processing engine that is programmable for processing digital video and digital audio simultaneously, either in parallel or concurrently, has an audio/video I/O processor that communicates with a single programmable hardware processor having reconfigurable logic blocks. The single programmable hardware processor communicates with both a general purpose processor and an optional digital signal processor for adjunct processing. The general purpose processor has a flash memory for initializing the programmable elements of the audio/video processing engine and has data links for remote accessing for programming, control and monitoring. The flash memory is accessible by the single programmable hardware processor, and may be reloaded remotely via the general purpose processor.

7 Claims, 1 Drawing Sheet

AUDIO/VIDEO PROCESSING ENGINE

BACKGROUND OF THE INVENTION

The present invention relates to audio/video data processing, and more particularly to an audio/video processing engine that is optimized for the audio and video computations associated with processing video at either standard or high definition rates.

Previously video and audio data have been processed separately. In a production environment the audio and video are recorded separately, processed separately and then only united for transmission as a broadcast signal or for final display by an end user. Likewise test equipment for audio and video data developed independently. With the advent of digital video, digital audio may be embedded in the digital video as ancillary data for transmission. However before embedment and after extraction the audio and video are still processed separately. This separate processing presents some problems, such as "lip sync" where the video and audio are noticeably out of sync when displayed to the end user. One attempt to solve this problem is represented by audio frame synchronizers, as disclosed in U.S. Pat. No. 4,313,135, where the video before and after processing is compared to determine a delay caused by the processing, which delay is used to likewise delay the audio to be in sync with the video. Another technique is disclosed in U.S. Pat. No. 4,963,967 where a coincidental marker is inserted into both the audio and video components so that the components may be synchronized at a receiver by realigning the coincidental markers. These techniques process the video and audio channels separately. Still another technique is disclosed in U.S. Pat. No. RE33,535 where a low resolution representation of the audio signal is inserted into the blanking interval of the video. However the blanking interval is stripped during digital processing, so the low resolution audio signal for synchronizing audio with video is lost.

However with the advent of watermarking technology, as disclosed in U.S. Pat. No. 4,969,041, an opportunity has been seen to use this technology to provide audio/video synchronization by inserting audio synchronization information in the form of a watermark into the active portion of the video U.S. Pat. Nos. 6,211,919 and 6,246,439). To perform this technology requires an audio/video processing engine that processes both audio and video simultaneously in real time.

Therefore what is desired is an audio/video processing engine that can process audio and video simultaneously in real time and is general purpose in nature so that by reprogramming any audio/video processing may be performed simultaneously.

BRIEF SUMMARY OF THE INVENTION

Accordingly the present invention provides an audio/video processing engine that has a single programmable hardware processor having reconfigurable logic blocks for performing realtime processing of digital video and digital audio simultaneously. The digital video and digital audio are input to and output from an audio/video I/O processor that in turn is bi-directionally coupled to the programmable hardware processor. The programmable hardware processor processes the digital video and audio received from the A/V I/O processor with the assistance of an optional digital signal processor and a general purpose processor having a flash memory for adjunct processing, and outputs the results via the A/V I/O processor. Also appropriate auxiliary memories, such as a video buffer and a general purpose memory, may be coupled to the programmable hardware processor. The programmable hardware processor is coupled to access the flash memory so that constants don't need to be downloaded into the programmable hardware processor. The general purpose processor is coupled to remote devices for control, testing and monitoring, and is used to remotely reload the flash memory according to the desired processing for the A/V processing engine.

The objects, advantages and other novel features of the present invention are apparent from the following detailed description when read in conjunction with the appended claims and attached drawing.

DETAILED DESCRIPTION OF THE INVENTION

Figure 1:
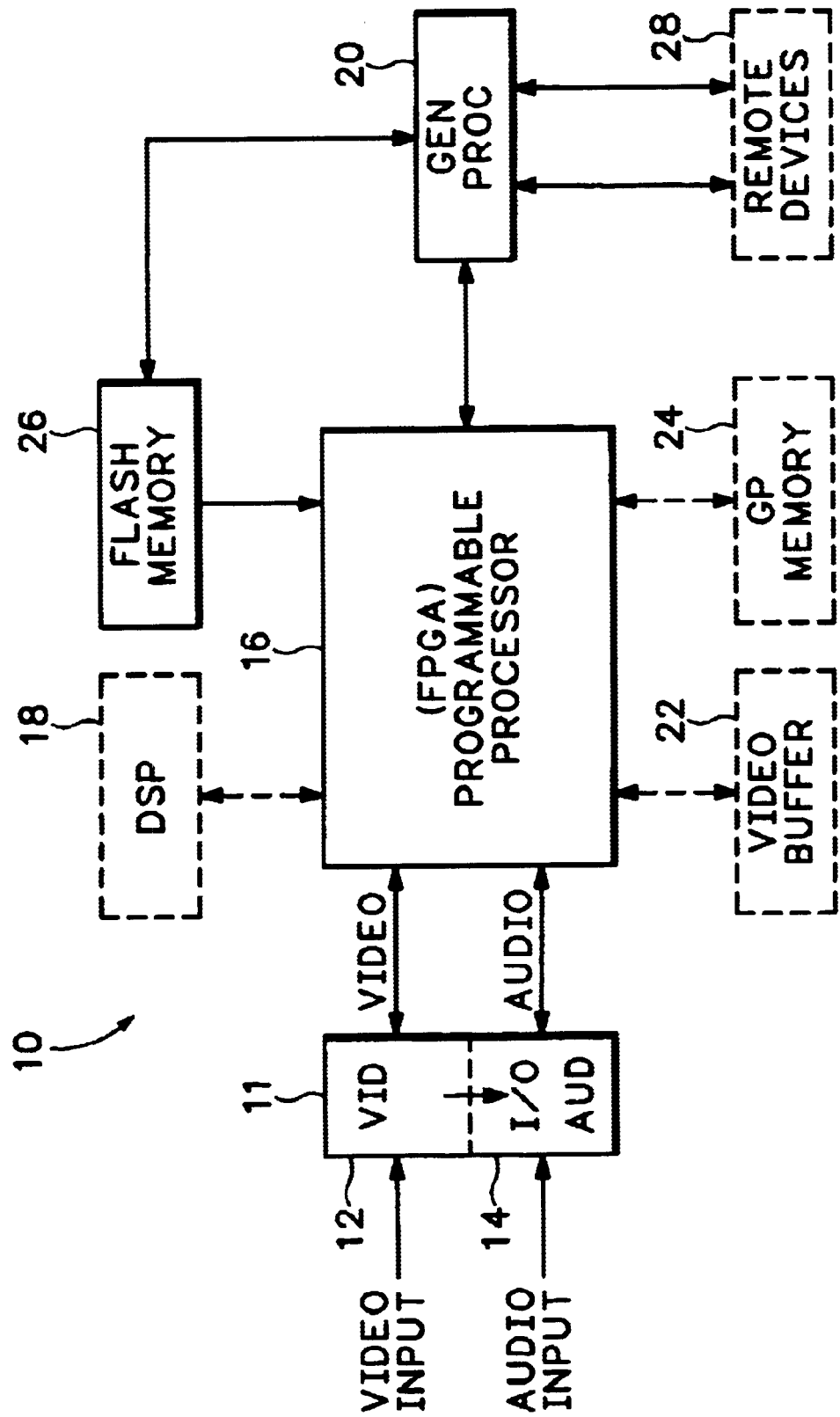
FIG. 1 is a block diagram for an audio/video processing engine according to the present invention.

Referring now to FIG. 1 an audio/video (A/V) processing engine 10 is shown having an audio/video (A/V) input/output (I/O) interface 11 with a video I/O processor 12 and an audio I/O processor 14. The video I/O processor 12 receives digital video, such as ITU-RBT.601 (CCIR-601) or SMPTE 292M serial digital video, which may include embedded audio as ancillary data and likewise outputs digital video. The audio I/O processor 14 receives an external digital audio, such as AES/EBU audio, and likewise outputs digital audio. The video I/O processor 12 also has an output coupled to the audio I/O processor 14 so that the embedded audio, which is extracted from the digital video by the video I/O processor, is input to the audio I/O processor for processing. The video and audio I/O processors 12, 14 are coupled bi-directionally to a single programmable hardware processor 16 having a completely reconfigurable set of logic blocks, such as a RAM-based field programmable gate array (FPGA), that may be reprogrammed almost instantaneously (within one or two seconds compared to minutes for flash-ROM processors). The programmable hardware processor 16 receives video and/or audio from the AN I/O interface 11 for processing in real time, and outputs processed video and/or audio to the A/V I/O interface. Also coupled bi-directionally to the programmable hardware processor 16 are an optional digital signal processor 18 and a general purpose processor 20 for adjunct processing. Finally additional memories, such as a video buffer memory 22 and a general purpose memory 24, may be bi-directionally coupled to the programmable processor 16. A flash memory 26 is bi-directionally coupled to the general purpose processor 20 and is coupled for access by the programmable hardware processor 16.

The video I/O processor 12 locks to input digital video, extracts a clock from it, converts the data to an appropriate format, performs error detection, extracts digital audio data from the ancillary data section of the video stream and outputs the formatted video and error status to the programmable hardware processor 16. The video I/O processor 12 also outputs the extracted digital audio to the audio I/O processor 14. Inversely the video I/O processor 12 converts digital video from the programmable hardware processor 16 into an appropriate output format and clocks it out.

The audio I/O processor 14 receives the digital audio stream from either an external source or from the video I/O processor 12 and decodes the one selected by a control signal from the programmable hardware processor 16. The decoded audio may be routed to the optional digital signal processor 18 and the general purpose processor 20 through the programmable hardware processor 16 so that software may choose which of the processors operates on the audio. Since audio is generally at a very low rate compared to the video (48 kHz v. 250 MHz, for example), the audio may be processed by the adjunct processors 18, 20 while the video is processed concurrently by the programmable hardware processor 16. Inversely the audio I/O processor 14 also generates digital audio received from the programmable hardware processor 16 for output in an appropriate format, such as in AES/EBU format, for retransmission.

The programmable hardware processor 16 is strategically placed so that the digital signal and general purpose processors 18, 20 have access to the video and audio inputs from the A/V I/O interface 11. Also the programmable hardware processor 16 implements a dual-port memory for inter-processor communication and controls high-speed buffer random access memory (RAM) that may be used either as fast look-up tables or for video buffering in support of pixel-rate video processing. Further the programmable hardware processor 16 is interfaced to the flash memory 26 of the general purpose processor 20 for run-time access to constants stored in the flash memory without needing to copy these to internal RAM at initialization.

The optional digital signal processor 18 may be equipped with high-speed SDRAM for code and data storage. It is interfaced with the programmable hardware processor 16 so that it may have access to the digital audio stream as well as intermediate parameters that result from pixel-rate processing of the video stream in the programmable hardware processor.

The general purpose processor 20 is the main processor. It also has high-speed SDRAM for program and data storage. It is interfaced with the programmable hardware processor 16 so that it has access to all intermediate results from pixel-rate processing in the programmable hardware processor. It also interfaces to external devices 28 over appropriate data links 28 via local area networks, wide area networks, the Internet or the like using 10 BaseT Ethernet, RS-232 protocol or the like. The general purpose processor 20 boots from the flash memory 26 and has the capability to initialize all other programmable hardware of the A/V processing engine 10. This feature, combined with the data link connection, allows the A/V processing engine 10 to be completely re-programmed remotely.

The A/V processing engine 10 makes provision for accepting digital video and audio and making them available to three layers of processing:

1. Pixel-rate processing is facilitated by the programmable hardware processor 16 which is capable of high speeds, such as in excess of 200 MHz. This allows digital filters and other high-speed processes to be implemented in real time for video processing.
2. Field and frame rate processing may be provided by the digital signal processor 18 which has access to the audio and video and which may control the pixel-rate logic implemented in the programmable hardware processor 16.
3. Supervisory (human-speed) processing is provided by the general purpose processor 20 which is equipped with a variety of external interfaces including RS-232 and 10 BaseT Ethernet, for example, for connection to external devices 28 via the data links.

All the functionality of the A/V processing engine 10 is controlled by code and data resident in the flash memory 26 that is accessible remotely via the data links. This allows a remote operator to download different functions and features into the A/V processing engine 10 without removing it from an installation. This capability allows the A/V processing engine 10 to provide completely different feature sets on the same hardware platform without removing it from the installation.

Also using data stored in the flash memory 26 the A/V processing engine 10 may be switched into a mode wherein it may generate a variety of video and audio test patterns for self-diagnostics or for output via the A/V I/O interface 11 as test signals for other devices under test.

As an example audio/video synchronization using watermarking technology may be performed using the A/V processing engine 10 as described below. A digital video signal with digital audio embedded as ancillary data is input to the video front end 12. The video front end 12 extracts the digital audio from the ancillary data and passes it to the audio front end 14, and also converts the video to a format for input to the programmable hardware processor 16. Meanwhile the audio front end 14 couples the digital audio to the programmable hardware processor 16 which, for example, calculates an audio envelop that is passed to the general purpose processor 20 for compression. The programmable hardware processor 16 also accesses the general purpose memory 24 to obtain necessary constants loaded from the flash memory 26 during initialization. The compressed audio envelop is then returned to the programmable hardware processor 16 for insertion as a holographic watermark into the video. Constants for the video watermarking process may be obtained from the general purpose memory 24 which is loaded from the flash memory 26 at initialization. The watermarked video is then returned to the video I/O interface 12 for transmission as watermarked digital video.

At a receiver having a similar AN processing engine 10 the watermarked digital video is input to the video I/O interface 12 and the corresponding digital audio, which may be received separately or which may be extracted from the ancillary data of the watermarked digital video, is input to the audio I/O interface 14. The audio stream from the audio I/O interface 14 is processed by the programmable hardware processor 16 to calculate the envelope, which again is passed to the general purpose processor 20. The watermarked digital video is converted to the appropriate format by the video I/O interface 12 and input to the programmable hardware processor 16 which uses the video buffer memory 22 in extracting watermark data from the video. The watermark data is passed to the general purpose processor 20 where it is decompressed to recover the original envelope, which is then correlated with the envelope from the audio stream to determine a delay. The delay is passed through the programmable hardware processor 16 to the digital signal processor 18, as is the audio stream from the audio I/O interface 14. The digital signal processor 18 applies the delay to the audio stream, and the delayed audio stream is then passed back through the programmable hardware processor 16 to the audio I/O interface 14 where it is output in synchronization with the watermarked digital video that is looped back out from the video I/O interface 12 after an appropriate delay to compensate for the processing time to achieve the desired A/V synchronization.

The flash memory 26 is used to boot up the general purpose processor 20, and then load the necessary information into the general purpose memory 24 and the optional digital signal processor 18 for it to also boot up. The flash memory 26 also contains information accessed by the programmable hardware processor 16 so that it does not have to be downloaded into the programmable hardware processor RAM.

The results of the audio/video processing may be transmitted by the general purpose processor 20 over the data links for remote viewing. Also the flash memory 26 may be reloaded remotely via the general purpose processor 20 to support any other audio and/or video processing desired. For example for testing, measuring and monitoring the digital video and/or the digital audio different information may be loaded into the flash memory 26 so as to provide digital video test patterns and/or digital audio test tones, so as to perform picture quality analysis of the digital video while the audio is otherwise analyzed in parallel, etc. without requiring separate processing engines for audio and video.

Thus the present invention provides an audio/video processing engine that is programmable for processing digital video and digital audio simultaneously either in parallel or concurrently having both an audio/video I/O processor that communicates with a single programmable hardware processor having reconfigurable logic blocks which in turn communicates with both a general purpose processor and an optional digital signal processor for adjunct processing, the general purpose processor having a flash memory for initializing the programmable elements of the engine and having ports for remote access for programming, control and monitoring, the flash memory also being accessible by the programmable hardware processor.

What is claimed is:

1. An audio/video processing engine for simultaneous realtime processing of digital video and digital audio comprising:

a single programmable hardware processor having a reconfigurable set of logic blocks;

an audio/video input/output processor having inputs for receiving and outputting the digital video and digital audio and having outputs bi-directionally coupled to the single programmable hardware processor to provide input audio/video from the audio/video input/output processor to the single programmable hardware processor and to provide processed audio/video from the single programmable hardware processor to the audio/video input/output processor; and a general purpose processor having a flash memory, the general purpose processor being bi-directionally coupled to the single programmable hardware processor and to a data link for remote access and the flash memory being accessible by the single programmable hardware processor.

2. The engine as recited in claim 1 further comprising a digital signal processor bi-directionally coupled to the single programmable hardware processor for access to the audio/video input/output processor and the general purpose processor.

3. The engine as recited in claim 1 wherein the single programmable hardware processor comprises a RAM-based field programmable gate array.

4. The engine as recited in claim 1 wherein the audio/video I/O processor comprises:

a video processor for converting input digital video into an appropriate video format for the single programmable hardware processor and converting processed digital video from the single programmable hardware processor into output digital video; and an audio processor for decoding input digital audio into an appropriate audio format for the single programmable hardware processor and converting processed digital audio from the single programmable hardware processor into output digital audio.

5. The engine as recited in claim 4 wherein the video processor comprises means for extracting embedded digital audio from the input digital video for input to the audio processor as the input digital audio.

6. The engine as recited in any of claims 1–5 further comprising an additional memory bi-directionally coupled to the single programmable hardware processor.

7. The engine as recited in claim 6 wherein the additional memory comprises:

a video buffer memory bi-directionally coupled to the single programmable hardware processor; and a general purpose memory bi-directionally coupled to the single programmable hardware processor.

* * * * *